United States Patent [19]

Hecht et al.

[11] 4,338,243

[45] Jul. 6, 1982

[54] POLYETHYLENE TEREPHTHALATE BLENDS

[75] Inventors: James L. Hecht; Paul C. Yates, both of Wilmington, Del.

[73] Assignee: E. I. Du Pont de Nemours and Company, Wilmington, Del.

[21] Appl. No.: 148,183

[22] Filed: May 7, 1980

[51] Int. Cl.³ .............................................. C08L 67/02
[52] U.S. Cl. ........................... 524/287; 260/DIG. 24; 525/165; 525/166; 525/173; 525/438; 524/167; 524/170; 524/173; 524/205; 524/232; 524/210; 524/292; 524/293; 524/295; 524/297; 524/356; 524/359; 524/361; 524/394; 524/410; 524/411
[58] Field of Search ............... 525/4, 3, 165, 166; 260/40 R, DIG. 35, DIG. 24, 22 R, 22 CB, 22 XA, 45.75 B

[56] References Cited

U.S. PATENT DOCUMENTS

| | | | |
|---|---|---|---|
| 3,560,441 | 2/1971 | Schwarcz et al. | 106/18.13 |
| 3,723,139 | 3/1973 | Larkin et al. | 106/18.27 |
| 3,816,367 | 6/1974 | Larkin et al. | 260/29.6 R |
| 3,892,667 | 7/1975 | Touval | 106/18.24 |
| 3,897,389 | 7/1975 | Touval | 260/45.75 B |
| 4,035,333 | 7/1977 | Kamada et al. | 26/40 R |
| 4,111,892 | 9/1978 | Kamada et al. | 525/4 |
| 4,151,223 | 4/1979 | Neuberg et al. | 525/4 |

FOREIGN PATENT DOCUMENTS 2015014  9/1979  United Kingdom .

OTHER PUBLICATIONS

Defensive Publication T-918,001 (Abstract published Jan. 1, 1974; 918 O.G. 103).

*Primary Examiner*—Theodore E. Pertilla

[57] ABSTRACT

Use of a selected antimonate has been found to increase flame-retardancy without lowering thermal resistivity of a polyurethane terephthalate molding blend which contains an ionic hydrocarbon copolymer or ionic salt of a hydrocarbon acid and a low molecular weight compound.

13 Claims, No Drawings

POLYETHYLENE TEREPHTHALATE BLENDS

FIELD OF THE INVENTION

This invention relates to polyethylene terephthalate molding blends, and more specifically to such blends that may be molded to obtain shaped articles of improved flame-retardancy.

BACKGROUND OF THE INVENTION

Historically, polyethylene terephthalate has been difficult to mold at molding temperatures below about 110° C. because its crystallization rate is so slow and uneven that warped articles are obtained. Moreover the articles tend to stick to the mold and are difficult to remove. Recently, it has been found that polyethylene terephthalate articles of good quality can be obtained by molding at lower temperatures, e.g., 80°–100° C., if certain materials are added to the resin prior to molding. These additive materials increase the rate of crystallization, and molded articles having smooth glossy surfaces that are easily removable from molds, are obtained when the materials are employed. The additive materials are (1) a sodium or potassium salt of a selected hydrocarbon acid or a sodium or potassium salt of a selected organic polymer containing pendant carboxyl groups and (2) a selected low molecular weight organic compound that is an ester, ketone, sulfone, sulfoxide, nitrile or amide.

However, when flame-retardant systems were employed with these improved crystallization rate materials in polyethylene terephthalate blends, it was found that articles molded from the blends either tended to exhibit inadequate thermal stability or the flame-retardant system did not operate effectively.

The thermal stability requirements for a flame-retardant composition of commercial value are such that PET molding resins need to be stable at a melt temperature of at least 292° C. for a minimum of eight minutes or more. Many applications are even more demanding. A common flame-retardant system comprises a halogenated organic compound and antimony oxide which acts as a synergist. It was determined that the antimony oxide synergist was causing the blend to become thermally unstable when molded at moderate hold-up times, as evidenced by a decrease in physical property values and by high melt flow. Poor thermal stability was also found with antimony pentoxide and a variety of coated antimony oxides which were tested. On the other hand, a number of materials sometimes used as synergists including zinc oxide, zinc sulfide, zinc borate, stannous oxide, molybdenum oxide and molybdates were found not to be effective in polyethylene terephthalate.

A synergist that does not affect heat stability while operating efficiently is desirable, and is provided by this invention.

SUMMARY OF THE INVENTION

It has been found that antimonates of the metals of Groups I, II and VIII of the Periodic Table when used in flame-retardant systems with the improved crystallization rate materials in polyethylene terephthalate blends do not adversely affect the heat stability and do enhance flame-retardancy.

Accordingly the polyethylene terephthalate molding blends of this invention are defined as (a) 20–90% by weight of blend of polyethylene terephthalate having an inherent viscosity of at least 0.4, (b) 0–50% by weight of blend of a reinforcing or filling material, (c) 1–12% by weight of blend of a sodium or potassium salt of a hydrocarbon carboxylic acid of 9–25 carbon atoms or a sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount of copolymer present is sufficient to provide a $\Delta H_H/\Delta H_c$ ratio of less than 0.25 to the blend, (d) 1–12% by weight of blend of a low molecular weight organic compound that is an ester, ketone, sulfone, sulfoxide, nitrile or amide of no more than 30 carbon atoms, provided the amount of the compound is sufficient to lower the Tpk of the blend by at least about 4° C., (e) a halogenated flame-retardant consisting of an aromatic organic compound having at least one aromatic ring in which the compound has sufficient halogen bonded directly to aromatic ring carbons to provide flame-retardant properties, said flame-retardant present in said blend in an amount sufficient to provide an amount of halogen to the blend of between about 2 and 20% by weight based on weight of blend.

(f) 0.5–10% by weight of blend of an antimonate of a metal of Group I, II or VIII of the Periodic Table.

DESCRIPTION OF THE INVENTION

The Polyethylene Terephthalate

The polyethylene terephthalate employed herein is one which has an inherent viscosity of at least 0.4 as measured by ASTM D-2857. The polyethylene terephthalate preferably has an upper limit on inherent viscosity of about 1.2. Inherent viscosity is measured in a 3:1 by volume ratio of methylene chloride and trifluoroacetic acid at 30° C. The polyethylene terephthalate can contain up to 50% by weight of other comonomers such as diethylene glycol, glutaric acid, polybutylene terephthalate, polyalkylene oxide, cyclohexane dimethanol, and other diols. Preferably the polyethylene terephthalate is present in an amount between 35 and 70% by weight of blend.

The Reinforcing or Filler Material

The reinforcing or filler material which may be employed herein includes glass fibers, graphite fibers, aramid fibers, glass beads, aluminum silicate, asbestos, mica, and the like, and combinations of them. The material is preferably present in an amount of between 15 and 50 percent by weight of blend.

The Crystallization Rate Increasing Materials

Representative acids for the sodium or potassium salts of a hydrocarbon carboxylic acid are stearic, pelargonic and behenic acids. Representatives of the ionic hydrocarbon copolymer are the salts of copolymers of olefins and acrylic or methacrylic acids, or copolymers of aromatic olefins and maleic anhydride. Preferably these materials include the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology.

Representative of the low molecular weight organic compounds are aromatic esters, or organic ketones, sulfones, sulfoxides, nitriles or amides. Preferably the organic ester is the product of an aromatic carboxylic acid of 7–11 carbon atoms containing at least 1 carboxyl group per aromatic nucleus, and an alcohol selected from those of the formula $(HOCH_2)_xR'$ wherein x is 1, 2 or 3 and R' is a hydrocarbon radical of 2–15 carbon atoms (preferably 2–10 carbon atoms) or those of the formula $HO—(R''O)_yR'''$ wherein y is a cardinal number between 1 and 15 and preferably between 1 and 8, R'' is a hydrocarbon radical of 2–15 carbon atoms (preferably 2–8 carbon atoms) and R''' is —H or a hydrocarbon radical of 2–20 carbon atoms (preferably 2–12 carbon atoms). Preferred organic esters are those in which the aromatic carboxylic acid and the aliphatic carboxylic acid are hydrocarbon acids containing 1–3 carboxyl groups and the alcohols are aliphatic. In other words, the R groups in the alcohols are alkyl or alkylene depending upon the particular R group. Preferably also when the carboxylic acids contains two or more carboxyl groups, the carboxyl groups are all reacted to form ester (COO) linkages, that is, there will be no free carboxyl groups present in the ester. Preferably, all the hydroxyl groups of the alcohols will also be reacted to form ester (COO) linkages, that is, there will be no free hydroxyl groups present in the ester.

A particularly preferred class of esters are those in which the acid is benzoic acid and the alcohol is $(HOCH_2)_2—R'$ wherein R' is alkylene of 4–6 carbon atoms (preferably neopentyl glycol) or $HO(R''O)_yH$ wherein R'' is ethylene or propylene, and y is 2 or 3.

While the organic esters are preferred for use herein, other compounds which may be employed include organic ketones of the formula

organic sulfones of the formula RSOOR,
organic sulfoxides of the formula R$_2$SO,
organic nitriles of the formula RCN, or
organic amides of the formula

wherein each R can be the same as or different from any other R and a hydrocarbyl group of 1–25 carbon atoms, while R' is hydrogen or a hydrocarbyl group of 1–25 carbon atoms.

Preferred ketones, sulfones, sulfoxides, nitriles and amides are those in which the R groups in the formulas provided further above for these organic compounds are aryl groups of 6–10 carbon atoms or alkyl groups of 1–10 carbon atoms.

Specific compounds within these definitions are listed following: diphenyl carbonate, dibenzoate of neopentyl glycol, dibenzoate of triethylene glycol, dibenzoate of diethylene glycol, dibenzoate of dipropylene glycol, tris-2-ethyl hexyl trimellitate, butyl carbitol adipate, triethylene glycol caprate-caprylate, phenyl benzoate, pentaerythritol tetrabenzoate, trimethylolethane tribenzoate, dioctylphthalate, diisodecyl phthalate, benzophenone, 4-fluorobenzophenone, diphenyl sulfone, N-ethyl-o,p-toluene sulfonamide, tolyl sulfoxide, lauryl nitrile, and erucyl nitrile.

The salt and low molecular weight organic compound aid in obtaining molded articles of high surface gloss at molding temperatures below 110° C. by increasing the rate of crystallization of polyethylene terephthalate. The salt is believed to primarily aid in increasing the rate of crystallization while the low molecular weight organic compound is believed to primarily improve the mobility of the polyethylene terephthalate in its melted state by reducing the viscosity of the polymer mixture. Both are necessary to obtain the high gloss found in the articles molded from the composition.

The amount of the salt present is an amount which will result in a $\Delta H_H/\Delta H_c$ ratio, of the blend less than 0.25. To find the $\Delta H_H/H_c$ polyethylene terephthalate is molded at 70° C. into 1/16" thick bars. The bars are heated at a rate of 10° C. per minute and at between 95° C. and 120° C. an exotherm (termed $\Delta H_H$) is recorded on a differential scanning calorimeter (DSC) cell attached to a Du Pont 900 Differential Thermal Analysis (DTA) device. The bar is heated to 290° (which is above its melting point) and the melted sample cooled at 10° C./minute. Another exotherm at between about 200°–225° C. (termed $\Delta H_c$) is the exotherm recorded on freezing of the sample. It has been found that the $\Delta H_H/\Delta H_c$ ratio is a convenient method of measuring the degree of crystallization.

The Tpk of the blends is the temperature at which heat evolves most rapidly during the heating cycle recited in the previous paragraph. The amount of the low molecular weight compound present in the blend is an amount which lowers the Tpk of the blend by at least 4° C. over that of an identical blend that does not contain the compound.

The ratio of the salt to the low molecular weight compound will generally be between 2:1 and 1:3.

The Halogenated Flame-Retardant

The halogenated flame-retardant consists of an aromatic compound which contains halogen, preferably bromine or chlorine atoms, attached directly to the aromatic ring or rings. The bromine content, when bromine is present, is at least 25% of the weight of the compound; and the chlorine content, when chlorine is present, is at least 40% of the weight of the compound. In addition, the flame-retardant compound should be substantially stable at up to 300° C. and should not cause degradation of polyethylene terephthalate. When the compound contains bromine, the amount of the bromine present in the blend should preferably be between 2–12% by weight of blend, and most preferably 5–10%. When the compound contains chlorine, the amount of the chlorine present should preferably be between 3–20% by weight of blend and most preferably 5–12%.

Representative flame-retardants include decabromodiphenyl ether, octabromodiphenyl ether, ethylene bis-(tetrabromophthalimide), brominated polystyrene, poly(dibromophenylene oxide), Dechlorane plus (the condensation product of two moles of tetrachlorocyclopentadiene and one mole of cyclooctadiene), and the like. Polymeric retardants may have molecular weight up to 200,000 or more.

The Antimonates

Antimonates of metals of Group I, II or VIII are effective herein. Preferably the amount of antimonate employed will be between about 1.5-4% by weight of blend. Representative antimonates include sodium, potassium, zinc or nickel antimonate, and mixtures thereof. The antimonate is usually employed in particulate or powder form.

Other Additives

In addition to the components discussed hereinabove, the blends of this invention may contain additives commonly employed with polyester resins, such as colorants, mold release agents, antioxidants, tougheners, nucleating agents, ultraviolet light and heat stabilizers and the like.

Preparation

The blends of this invention are prepared by blending the components together by any convenient means to obtain an intimate blend. Neither temperature nor pressure are critical. For example, the polyethylene terephthalate can be mixed dry in any suitable blender or tumbler with the other components and the mixture melt-extruded. The extrudate can be chopped. If desired the reinforcing or filling agent can be omitted initially and added after the first melt extrusion, and the resulting mixture can then be melt extruded.

EXPERIMENTS

In the Experiments which follow, percents are based on total blend unless otherwise noted.

Properties of molded test bars were measured according to the following procedures:

Tensile strength and elongation were measured on injection molded bars by ASTM Method D638. Test bars were ⅛" ASTM-638-Type I bars.

Unnotched impact strength was measured by cutting 5×½×⅛" injection molded bars to the size specified for the Izod test in ASTM Method D256, but without notching the bars, and otherwise running the test by Izod method ASTM D256.

Flame-retardancy was measured by Underwriter's Laboratory Method UL-94.

Melt flow was determined as described in ASTM D-1238-73 using Tinius Olsen equipment. The orifice block had a land length of 0.315 inch and a diameter of 0.0825 inch. Temperature was controlled to within 0.2° C. The sample was dried at 150° C. for 4-6 hours before testing. The sample was added; and at the time of test, was allowed to flow through the orifice for 5-30 seconds.

EXAMPLE 1

A blend was made of the following materials:

3,200 grams (46.9%) of polyethylene terephthalate polymer which had an intrinsic viscosity of 0.60 and which had been dried to less than 0.05% water.

763 grams (11.2%) of a brominated polystyrene having a softening point of 235° C., which provided 7.6% bromine content by weight to the blend, and which contained 68% bromine.

259 grams (3.8%) of sodium antimonate.

246 grams (3.6%) of ethylene/methacrylic acid copolymer (85/15 by weight) which had been neutralized with sodium.

218 grams (3.2%) of the dibenzoate of neopentyl glycol.

41 grams (0.6%) of the epoxide formed from "Bisphenol" A and epichlorohydrin ("Epon" 1009 from Shell Chemical) to improve adhesion of glass fiber to polyethylene terephthalate.

38 grams (0.6%) of polyethylene wax to improve mold release.

8 grams (0.1%) of tetrakis[methylene(3,5-di-tert-butyl-4-hydroxyhydrocinnamate)]methane (an anti-oxidant).

2,040 grams (3.0%) of glass fibers with a diameter of 0.375 mils and an initial length before extrusion of 3/16-inch.

This blend, after mixing by shaking, was passed through a two-stage, two-inch extruder in which the vacuum port was held at about 26 inches vacuum. The melt, which was at a temperature of about 285° C., was passed through a die to give a single strand which was cooled and cut.

The resin thus produced was dried in a vacuum oven for 18 hours at 120° C. prior to molding in a six-ounce injection molding machine. Molding conditions were a fast ram, a ten-second forward time; a fifteen-second mold close time, a melt temperature of 290° C.; and a mold cavity temperature of 110° C. The part readily released from the mold without sticking. This blend is labelled 1A.

For comparison purposes, a blend labelled 1B, containing the same concentration of each of the above ingredients was prepared except that antimony oxide was used in place of sodium antimonate. Both compositions gave molded parts which were V-O by the U194 tests for thicknesses of both ⅛ inch and 1/16 inch. In addition, as shown by the data in Table 1, physical properties are similar when a short 3 minute hold-up time was used during molding. However, while the composition using antimony oxide was unsatisfactory at a holdup time of only 8 minutes at the melt temperature used, when sodium antimonate was used as the synergist, the thermal stability was satisfactory. This also is shown by the data in Table 2 which show that the melt flow of the composition containing sodium antimonate is very stable while the composition with antimony oxide has very poor melt stability.

TABLE 1

| PROPERTIES OF FLAME RETARDANT COMPOSITIONS | | | | |
|---|---|---|---|---|
| | 1A Sodium Antimonate Used as Synergist Hold-up Time | | 1B Antimony Oxide Used as Synergist Hold-up Time | |
| | 3 min | 8 min | 3 min | 8 min |
| Unnotched Impact | 13 | 13 | 12 | 5 |
| Tensile Strength, Mpsi | 21 | 21 | 22 | 11 |
| Elongation % | 2.3 | 2.3 | 2.3 | 1.1 |

TABLE 2

CHANGE IN MELT FLOW OF FLAME RETARDANT COMPOSITIONS

| | 1A Sodium Antimonate Used as Synergist | 1B Antimony Oxide Used as Synergist |
|---|---|---|
| Percent Increase in Flow After 10 Minutes at 290° C., Compared to Flow After 5 Minutes | None | 320 |
| Percent Increase in Flow After 15 Minutes at 290° C., Compared to Flow After 5 Minutes | None | 1,640 |
| Percent Increase in Flow After 15 Minutes at 300° C., Compared to Flow After 5 Minutes | 140 | Too high to measure |

EXAMPLE 2

Example 2, which demonstrates the use of another halogenated aromatic flame-retardant, was made and tested in a manner identical to Example 1. The blend contained 3,500 grams (51.2%) of polyethylene terephthalate, as in Example 1.

528 grams (7.75%) of ethylene bis-(tetrabromophthalimide), which contains 67% bromine.

221 grams (3.25%) of sodium antimonate.

217 grams (3.15%) of the ethylene/methacrylate acid copolymer of Example 1.

224 grams (3.25%) of the dibenzoate of neopentyl glycol.

40 grams (0.6%) of the epoxide used in Example 1.

34 grams (0.5%) of polyethylene wax.

21 grams (0.3%) of the antioxidant used in Example 1.

2,040 grams (30.0%) of the glass fibers used in Example 1.

This blend is designated 2A. For comparison purposes, a blend designated 2B, containing the same concentration of each of these ingredients was prepared except that antimony oxide was used in place of sodium antimonate. The blends were molded as described in Example 1. Both compositions gave molded parts which were V-O by the UI94 test for thicknesses of both ⅛ inch and 1/16 inch. As shown by the data in Table 3, the composition containing sodium antimonate gave the same physical properties when the holdup time was 8 minutes as when it was 3 minutes; but the composition containing antimony oxide as the synergist (2B) gave much lower physical properties at a holdup time of 8 minutes than at 3 minutes.

The superior thermal stability of the composition containing sodium antimonate also is shown by the data in Table 4, which show that the melt flow of the composition containing sodium antimonate is stable while the composition with antimony oxide has poor melt stability.

TABLE 3

PROPERTIES OF FLAME RETARDANT COMPOSITIONS

| | 2A Sodium Antimonate Used as Synergist | | 2B Antimony Oxide Used as Synergist | |
|---|---|---|---|---|
| | Hold-up Time | | Hold-up Time | |
| | 3 min | 8 min | 3 min | 8 min |
| Unnotched Impact | 12 | 12 | 10 | 4 |
| Tensile Strength, Mpsi | 22 | 22 | 19 | 9 |
| Elongation % | 2.1 | 2.1 | 1.5 | 0.7 |

TABLE 2

CHANGE IN MELT FLOW OF FLAME RETARDANT COMPOSITIONS

| | 2A Sodium Antimonate Used as Synergist | 2B Antimony Oxide Used as Synergist |
|---|---|---|
| Percent Increase in Flow After 10 Minutes at 290° C., Compared to Flow After 5 Minutes | None | 640 |
| Percent Increase in Flow After 15 Minutes at 290° C., Compared to Flow After 5 Minutes | 30 | Too high to measure |

We claim:

1. A molding blend consisting essentially of
   (a) 20-90% by weight of blend of polyethylene terephthalate having an inherent viscosity of at least 0.4,
   (b) 0-50% by weight of blend of a reinforcing or filling material,
   (c) 1-12% by weight of blend of a sodium or potassium salt of a hydrocarbon carboxylic acid of 9-25 carbon atoms or a sodium or potassium salt of an ionic hydrocarbon copolymer of an α-olefin of 2-5 carbon atoms and an α,β-ethylenically unsaturated carboxylic acid of 3-5 carbon atoms in which the carboxyl groups have been at least partially neutralized with Na+ or K+ cations, provided the amount of copolymer present is sufficient to provide a $\Delta H_H/\Delta H_c$ ratio of less than 0.25 to the blend,
   (d) 1-12% by weight of blend of a low molecular weight organic compound that is an ester, ketone, sulfone, sulfoxide, nitrile or amide of no more than 30 carbon atoms, provided the amount of the compound is sufficient to lower the Tpk of the blend by at least about 4° C.,
   (e) a halogenated flame-retardant consisting of an aromatic organic compound having at least one aromatic ring in which the compound has sufficient halogen bonded directly to the aromatic ring carbons to provide flame-retardant properties, said flame-retardant present in said blend in an amount sufficient to provide an amount of halogen to the blend of between about 2 and 20% by weight based on weight of blend,
   (f) 0.5-10% by weight of blend of an antimonate of a metal of Groups I, II or VIII of the Periodic Table.

2. The blend of claim 1 wherein the reinforcing or filling material is present in an amount of between about 15 and 50 percent by weight of blend and is glass fiber.

3. The blend of claim 1 wherein component (c) is a sodium or potassium salt of the ionic hydrocarbon copolymer defined in claim 1.

4. The blend of claim 2 wherein the sodium or potassium salt defined in claim 3 is the salt of a copolymer of an olefin and an acrylic or methacrylic acid.

5. The blend of claim 1 wherein component (d) is an aromatic ester.

6. The blend of claim 1 wherein component (e) is one in which the halogen is bromine.

7. The blend of claim 6 wherein component (e) is a brominated polystyrene.

8. The blend of claims 1, 2, 6 or 7 wherein the antimonate is the antimonate of a metal of Group I of the Periodic Table.

9. The blend of claim 8 wherein the antimonate is sodium antimonate.

10. The blend of claims 1, 2, 6 or 7 wherein the antimonate is zinc antimonate or nickel antimonate.

11. The blend of claims 1, 2, 6 or 7 wherein the antimonate is a blend of sodium antimonate and zinc antimonate.

12. Process for preparing the blend of claim 1 which comprises mixing the components of the blend and then melt-extruding the mixture.

13. Process for preparing a molded article which comprises melting a blend of claim 1, placing the melted blend into a mold, and then allowing the blend to solidify.

* * * * *